(12) United States Patent
Hanel

(10) Patent No.: US 8,113,758 B2
(45) Date of Patent: Feb. 14, 2012

(54) STORAGE RACK

(75) Inventor: Karl-Bruno Hanel, Bad Friedrichshall (DE)

(73) Assignee: Hanel GmbH & Co. KG, Bad Friedrichshall (DE)

( * ) Notice: Subject to any disclaimer, the term of this patent is extended or adjusted under 35 U.S.C. 154(b) by 0 days.

(21) Appl. No.: 12/971,937

(22) Filed: Dec. 17, 2010

(65) Prior Publication Data

US 2011/0084041 A1    Apr. 14, 2011

Related U.S. Application Data

(63) Continuation of application No. 11/568,288, filed as application No. PCT/EP2005/054168 on Aug. 24, 2005.

(30) Foreign Application Priority Data

Aug. 26, 2004   (DE) .......................... 10 2004 042 061

(51) Int. Cl.
*B65G 1/00* (2006.01)

(52) U.S. Cl. .......... 414/266; 414/267; 414/268; 211/26; 211/190; 211/207

(58) Field of Classification Search .................. 414/266, 414/267, 268; 211/26, 190, 187, 207
See application file for complete search history.

(56) References Cited

U.S. PATENT DOCUMENTS

| 3,023,910 A | 3/1962 | Schless, Jr. |
| 5,477,426 A | 12/1995 | Bethurum |
| 5,484,308 A | 1/1996 | Gotz et al. |
| 2003/0147738 A1* | 8/2003 | Hanel ........................... 414/807 |
| 2003/0213829 A1 | 11/2003 | Bruins et al. |
| 2005/0103734 A1* | 5/2005 | Saltzberg et al. ............. 211/187 |

FOREIGN PATENT DOCUMENTS

| DE | 298 07 208 U1 | 8/1999 |
| EP | 0 722 894 A1 | 1/1996 |
| GB | 972513 | 10/1964 |

OTHER PUBLICATIONS

International Search Report dated Dec. 1, 2005 in PCT Application No. PCT/EP2005/054168 (4 pages).

* cited by examiner

*Primary Examiner* — Saul Rodriguez
*Assistant Examiner* — Willie Berry, Jr.
(74) *Attorney, Agent, or Firm* — Brian B. Shaw, Esq.; Michael J. Didas, Esq.; Harter Secrest & Emery LLP

(57) ABSTRACT

A storage rack comprises a plurality of slacked supporting ledges each spaced away from each other arranged in pairs on facing sidewalls for receiving plate-type carriers for stored articles. Storage and retrieval of the carriers in the storage rack is provided by a transport device. The supporting ledges are a snaked press fit in the sheet metal of the sidewalls and the sidewalls are secured to upright rack stanchions. To define a storage rack ensuring exact positioning of the supporting ledges, it is proposed that the rack stanchions comprise horizontally protruding pegs engaging cavities in the supporting ledges.

14 Claims, 2 Drawing Sheets

STORAGE RACK

CROSS-REFERENCE TO RELATED APPLICATIONS

The present application is a continuation of U.S. Non-Provisional patent application Ser. No. 11/568,288, filed Oct. 25, 2006, which is a national stage application of International Patent Application No. PCT/EP2005/054,168, filed Aug. 4, 2005, which claims the priority of German Patent Application No. 10 2004 042 061.0, filed Aug. 26, 2004, the entire disclosures of which are incorporated herein by reference.

STATEMENT REGARDING FEDERALLY SPONSORED RESEARCH OR DEVELOPMENT

Not applicable

REFERENCE TO A "SEQUENCE LISTING"

Not applicable.

DESCRIPTION OF RELATED ART

Described in EP 0 722 894 A 1 is a storage rack comprising two high-bays with a transport device arranged in between. The transport device comprises a platform for storage or retrieval of carriers to storage locations. The platform is moved between an access opening and the storage locations. The carriers with the stored articles thereon are placed on the platform at the access opening.

The supporting ledges on which the carriers are guided and supported are integrated in the sidewalls. The sheet metal sidewalls are formed snaked to form the supporting ledges and welded to the upright stanchions.

Such storage racks are of considerable height. They usually comprise a plurality of sidewall elements with integrated supporting ledges secured to the stanchions of the storage rack by welds. Producing the welds may result in the sidewall elements and thus the supporting ledges not being optimally aligned, causing problems in pushing in and pulling out the carrier.

Precisely locating the supporting ledges is, however, vital for automated carrier access. Lack of precision in positioning the supporting ledges would result in tilting of the carriers, often carrying heavy loads, making carrier storage difficult or even impossible.

It is thus an object of the invention to define a storage rack, which ensures precise positioning of the supporting ledges.

To achieve this object it is proposed in a generic storage rack that the rack stanchions comprise horizontally protruding pegs engaging cavities in the supporting ledges.

The invention is based on the gist that for precisely securing the sidewalls to the rack stanchions it is necessary to position the sidewalls at the rack stanchions. In accordance with the invention, the rack stanchions comprise pegs, which protrude from the rack stanchions such that they engage snaked cavities in the supporting ledges. The pegs can be precisely positioned at rack stanchions so that when joining the sidewall to the rack stanchions precise positioning of the supporting ledges is possible. A further advantage materializes in that due to the horizontally protruding pegs the load supported by the supporting ledges is increased as a result of which the carriers can now be devised for higher loading.

Advantage aspects of the invention read from the subclaims.

BRIEF SUMMARY OF THE INVENTION

The invention relates to a storage rack comprising a plurality of stacked supporting ledges each spaced away from each other arranged in pairs on facing sidewalls for receiving plate-shaped carriers for stored articles, wherein storage and retrieval of the carriers in supporting ledges in the storage rack being provided by means of a transport device, and wherein the supporting ledges being a snaked press fit in the sheet metal of the sidewalls and the sidewalls secured to upright rack stanchions.

Such storage racks are used for automated and space optimized storage and retrieval of articles differing in height in a storage rack.

In one advantageous aspect of the invention, the pegs comprise an outer diameter, which substantially corresponds to an inner spacing of the supporting ledges in thus enabling the sidewalls with the integrated supporting ledges to be simply mounted on the pegs at the rack stanchions for jointing by means of welds to the rack stanchions.

In a further advantageous aspect, the pegs are aligned facing each other in a horizontally plane from facing rack stanchions Thus, simple alignment of the supporting ledges to each other can be realized. Any horizontal stagger of facing supporting ledges would result in tilting of the carriers, which could lead to the articles on the carriers slipping out of place. Such a tilting of the carriers is prevented by the pegs at the rack stanchions.

In another advantageous aspect, the pegs are fixed in place by means of a press fit in the rack stanchions. This facilitates applying the pegs to the rack stanchions. As an alternative, the pegs can also be screwed into a tapping in the rack stanchions.

It is particularly of advantage when the pegs are gunned into the rack stanchions. This makes it necessary to drill holes in corresponding positions of the rack stanchions having a smaller dimension than the outer diameter of the pegs. The pegs are gunned into the prefabricated drilled holes, achieving simple fabrication of the rack stanchions with the pegs.

BRIEF DESCRIPTION OF THE SEVERAL VIEWS OF THE DRAWING(S)

The invention will now be detailed by way of a preferred embodiment with reference to the attached diagrammatic drawings in which.

DETAILED DESCRIPTION OF THE INVENTION

Figure 1:
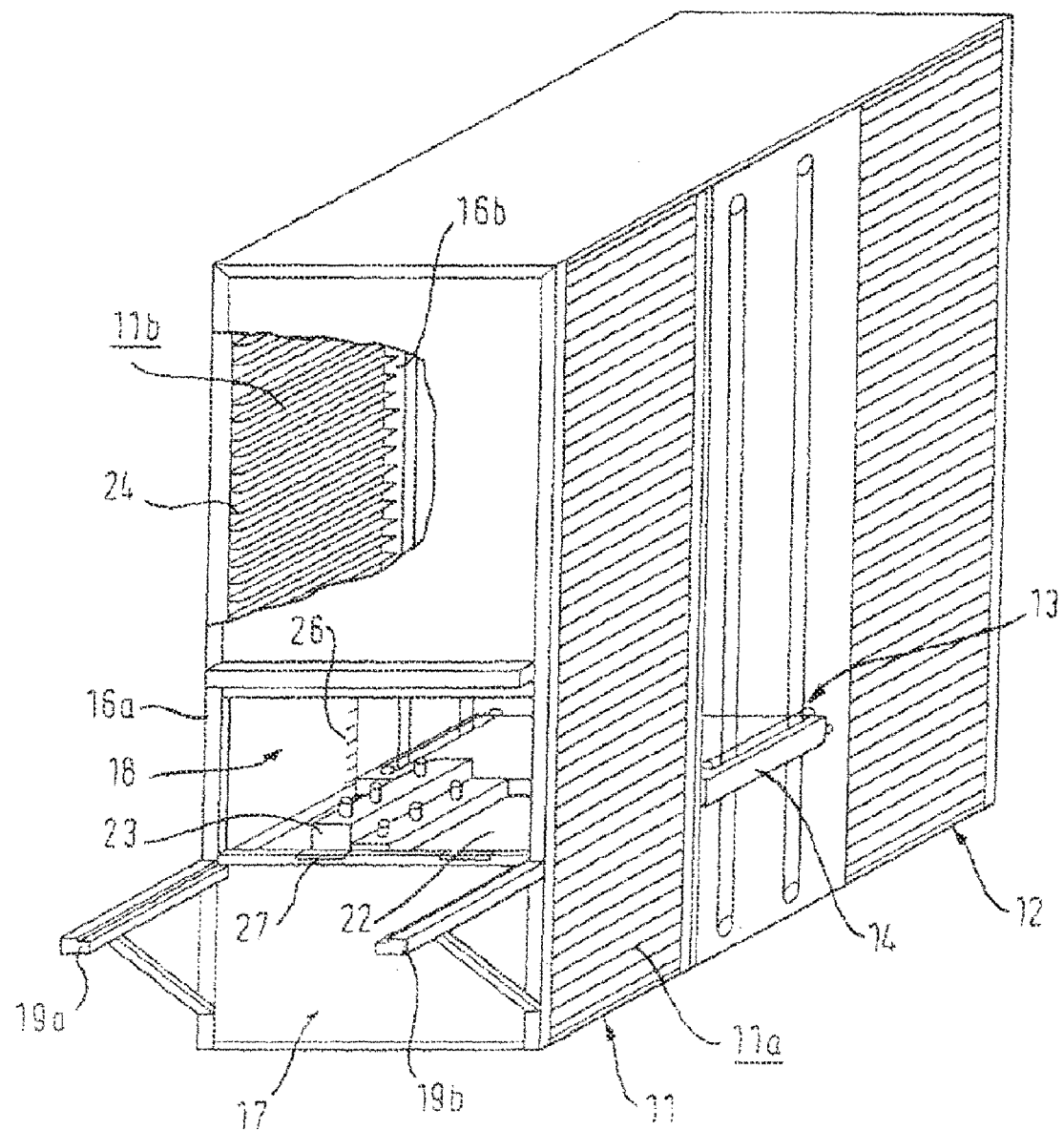
FIG. 1 is a view in perspective of a storage rack in accordance with the invention.

Referring now to FIG. 1, there is illustrated a racking system in accordance with the invention comprising two facing storage racks 11, 12 spaced away from each other. Provided between the storage racks 11, 12 is a transport device 13. The transport device 13 comprises a platform 14, which is positionable in the storage rack by means of a drive system. The storage racks 11, 12 each comprise sidewalls 11a, 11b aligned parallel to each other.

The sidewalls 11a, 11b consist of a plurality of elements secured to the upright rack stanchions spaced away from each other 16a and 16b by means of spot welds.

Provided at the face 17 of the storage racks 11 is an access opening 18, featuring supporting arms 19a, 19b aligned parallel to each other protrude forwards to support a carrier. Storage and retrieval of the carriers 22 with the storage articles 23 is possible via the access opening 18.

The carrier 22 comprises handles 27. Provided further is a height sensor 26 to determine the height of the storage articles 23 for storage and thus to permit location-optimized storage.

Figure 2:
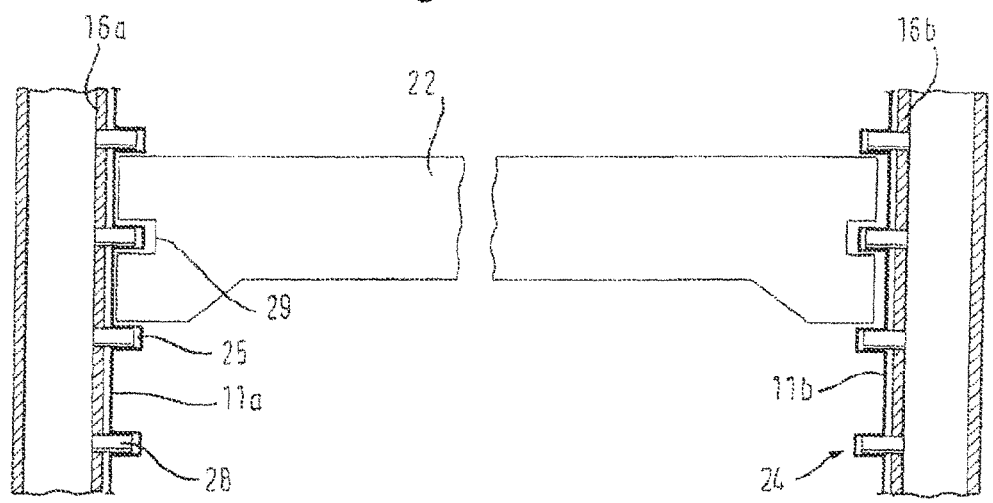
FIG. 2 is a section view through the storage rack as shown in FIG. 1.

Referring now to FIG. 2, there is illustrated a section view through the rack stanchions 16a arranged at the face of the storage racks 11 and the sidewalls 11a, 11b secured thereto. The sidewalls 11a, 11b are made of sheet metal and comprise snaked press-fitted support ledges 24. Guided and supported by these support ledges 24 are the carriers 22. The snaked support ledges 24 form cavities 25 that are aligned outwardly towards the rack stanchions 16a, 16b.

Secured to the rack stanchions 16a, 16b are horizontally protruding pegs 28 on a predefined spacing correspondingly positioned. For this purpose, a press fit is used preferably. For this purpose, holes are drilled in the rack stanchions 16a, 16b into which the correspondingly prefabricated pegs 28 are gunned. After the pegs 28 have been attached to the rack stanchions 16a, 16b correspondingly positioned, the sidewall 11a, 11b is mounted with the integrated support ledges 24 on the rack stanchions 16a, 16b. In this arrangement the cavities 25 of the support ledges 24 are located on the pegs so that precise positioning of the sidewalls 11a, 11b at the rack stanchions 16a, 16b materializes. After the sidewalls 11a, 11b are precisely positioned on the peg 28 the sidewall is secured to the rack stanchions 16a, 16b by means of spot welds.

Figure 3:
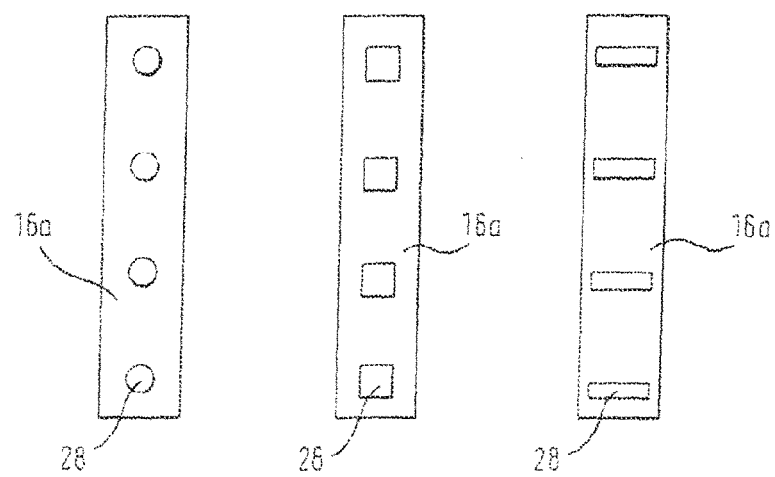
FIG. 3 is a plan view on alternative peg shapes.

Depending on how the support ledges 24 are configured, the pegs 28 may comprise differing peg cross-sections. Referring now to FIG. 3 there is illustrated a plurality of rack stanchions 16a with differing peg crosssections.

The carrier 22 as shown in FIG. 2 is mounted between two facing rack stanchions 16a, 16b. The carrier 22 comprises a guide groove 29 in the middle so that the carrier 22 is guided on two stacked support ledges 24. By using two support ledges 24 per side a higher loading capacity for the carriers 22 is achieved. In addition, the loading capacity for the carriers 22 is increased by the use of pegs 28 since the support ledges 24 can now handle a higher shear force. Although it is possible to boost the loading capacity by dimensioning the sidewalls 11a, 11b stronger, however, thicker sidewalls would add to the weight of the storage rack and thus reduce the storage capacity of the storage rack.

Using the additional guide groove 29 permits positioning the carriers 22 also at intermediate positions in the storage racks 11, resulting in particularly space-optimized storage. This particularly effective storage requires in turn that the support ledges 24, on which the carrier 22 is guided, are positioned particularly exactly. This is ensured by using the pegs 28 in accordance with the invention, resulting in exact alignment of the support ledges 24.

Accordingly, using the pegs 28 in accordance with the invention ensures that the support ledges 24 are positioned as needed in the storage rack whilst simultaneously attaining increased loading capacity.

The invention claimed is:

1. A storage device for receiving horizontally-oriented carriers for stored articles, comprising:
a first pair of substantially vertical stanchions;
a second pair of substantially vertical stanchions spaced from the first pair;
a plurality of pegs extending from the stanchions at predetermined locations; and
a first sidewall connected to the first pair of stanchions and a second sidewall connected to the second pair of stanchions, each sidewall having a first surface facing the stanchion and the plurality of pegs and an opposite second surface, each sidewall defining a plurality of cavities opening to the first surface of the sidewall, and a portion of the sidewall defining each cavity also defining a corresponding support ledge on the second surface of the sidewall,
each cavity receiving a respective peg of the plurality of pegs.

2. The storage device of claim 1, further comprising a transport device moveable vertically relative to the sidewall.

3. The storage device of claim 2, wherein the transport device is moveable between a plurality of positions corresponding to the support ledges.

4. The storage device of claim 1, further comprising a carrier on at least one of the support ledges.

5. The storage device of claim 4, wherein the carrier defines a guide groove extending along a side thereof, the guide groove slidably receiving the at least one support ledge.

6. The storage device of claim 4, wherein the carrier is disposed substantially perpendicular to the sidewall.

7. The storage device of claim 1, wherein the pegs are at least one of press-fit, screwed and gunned into their respective stanchions.

8. A storage device for receiving horizontally oriented carriers for storing articles thereon, comprising;
a pair of substantially vertical first stanchions having a first plurality of vertically spaced pegs extending therefrom;
a pair of substantially vertical second stanchions having a second plurality of vertically spaced pegs extending therefrom;
a first sidewall disposed on the first stanchions having a first surface facing the first stanchions and an opposite second surface, the first surface defining a plurality of vertically spaced horizontally extending first cavities, each first cavity receiving one or more of the first plurality of pegs, the second surface of the first sidewall at each of the first cavities defining a support ledge; and
a second sidewall disposed on the second stanchions facing the first sidewall and having a first surface facing the second stanchions and an opposite second surface, the first surface defining a plurality of vertically spaced, horizontally extending second cavities, each second cavity receiving one or more of the second plurality of pegs, and the second surface of the second sidewall at each of the second cavities defining a second support ledge.

9. The storage device of claim 8, wherein at least one of the first support ledges is substantially vertically aligned with a second support ledge and further comprising a carrier mounted on the substantially vertically aligned support ledges.

10. The storage device of claim 8, further comprising a transport device moveable vertically relative to the first and second sidewalls.

11. The storage device of claim 8, wherein the pegs are at least one of press-fit, screwed and gunned into their respective stanchions.

12. A storage device for receiving horizontally-oriented carriers with storage articles thereon comprising:
(a) a first storage rack comprising:
a pair of first substantially vertical stanchions spaced from each other and having a first plurality of vertically spaced pegs extending therefrom, a pair of second substantially vertical stanchions spaced from each other and having a second plurality of vertically spaced pegs extending therefrom; and first and second sidewalls supported respectively by the first and second stanchions, each having a first surface facing the respective stanchions and an opposite second surface, each sidewall having a snaked cross-section defining a plurality of cavities on the first surface bounded by top, bottom and end portions and a plurality of support ledges on the second surface, opposite the top portion of the cavities, the cavities in the first sidewall being sized to receive one or more of the first pegs and the cavities in the second sidewall being sized to receive one or more of the second pegs;

(b) a second storage rack spaced from the first storage rack and having an opening facing and opening in the first storage rack, the second storage rack comprising:

a pair of third substantially vertical stanchions spaced from each other and having a third plurality of vertically spaced pegs extending therefrom, a pair of fourth substantially vertical stanchions spaced from each other and having a fourth plurality of vertically spaced pegs extending therefrom; and third and fourth sidewalls supported respectively by the third and fourth stanchions, each having a first surface facing the respective stanchions and an opposite second surface, each sidewall having a snaked cross-section defining a plurality of cavities on the first surface bounded by top, bottom and end portions and a plurality of support ledges on the second surface, opposite the top portion of the cavities, the cavities in the third sidewall being sized to receive one or more of the third pegs and the cavities in the fourth sidewall being sized to receive one or more of the fourth pegs; and (c) a transport device disposed between the first and second storage racks comprising a platform positionable between the openings of the first and second storage racks by a drive system.

13. The storage device of claim 12, wherein each of the pegs has an outer diameter substantially corresponding to a distance between the top portion and the bottom portion of a given cavity.

14. The storage device of claim 12, wherein the pegs are at least one of press-fit, screwed and gunned into their respective stanchions.

* * * * *